United States Patent [19]

Burns et al.

[11] 3,890,468

[45] June 17, 1975

[54] CIRCUIT ARRANGEMENT FOR GROUND START COIN OPERATED TELEPHONES

[75] Inventors: Robert V. Burns, Tinley Park; Richard J. Hamilton, West Chicago, both of Ill.

[73] Assignee: GTE Automatic Electric Laboratories Incorporated, Northlake, Ill.

[22] Filed: Dec. 3, 1973

[21] Appl. No.: 421,301

[52] U.S. Cl. .................................................. 179/6.5

[51] Int. Cl. .......................................... H04m 17/02

[58] Field of Search .................. 179/6.3 R, 6.4, 6.5; 194/1 M, 1 H, 17, 44, 8

[56] References Cited

UNITED STATES PATENTS

| | | | |
|---|---|---|---|
| 3,279,480 | 10/1966 | Jarvis | 194/1 N |
| 3,307,671 | 3/1967 | Shirley | 194/1 N |
| 3,728,490 | 4/1973 | Nowicki | 179/6.3 R |
| 3,737,576 | 6/1973 | Spencer | 179/6.3 R |
| 3,760,101 | 9/1973 | Burns | 179/6.3 R |
| 3,814,907 | 6/1974 | Edington et al. | 179/6.3 R |

*Primary Examiner*—Kathleen H. Claffy
*Assistant Examiner*—Gerald L. Brigance
*Attorney, Agent, or Firm*—Robert J. Black

[57] ABSTRACT

A circuit arrangement, utilizing a variable initial deposit rate totalizer for providing a ground start mode of operation or prepay coin telephones.

8 Claims, 1 Drawing Figure

PATENTED JUN 17 1975
3,890,468
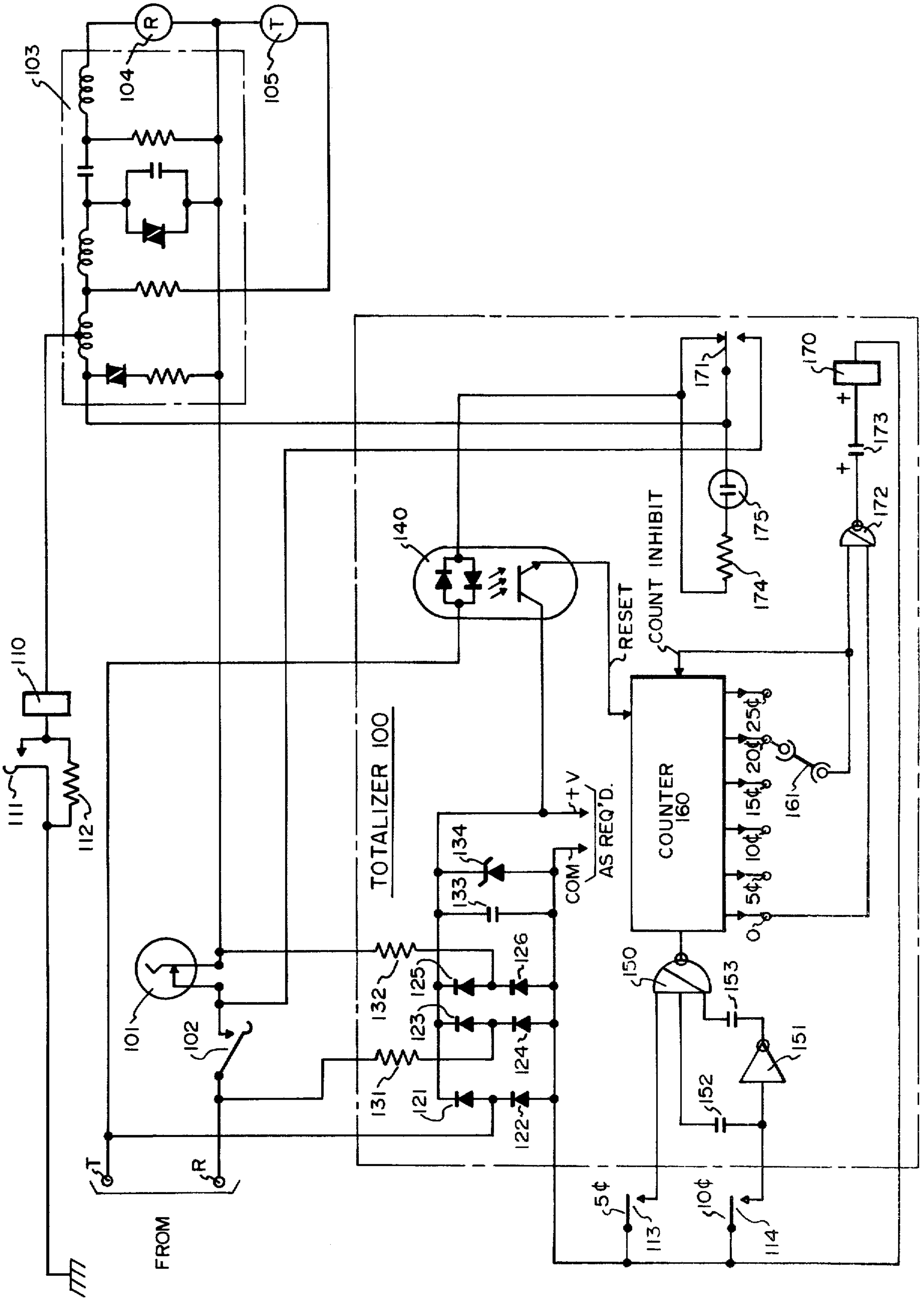

CIRCUIT ARRANGEMENT FOR GROUND START COIN OPERATED TELEPHONES

BACKGROUND OF THE INVENTION

1. Field of the Invention

This invention relates to coin telephones and more particularly to a circuit arrangement providing a ground start mode of operation for prepay coin telephones.

2. Description of the Prior Art

A number of modes of operation for coin operated telephones are currently in use. These modes may be broadly classified as prepay operation and postpay operation. Postpay operation is always of the loop start type, while prepay systems may be either of the loop start or ground start types of operation. In order to seize the central office equipment, loop start systems require completion of a path between the tip and ring conductors of the telephone line whereas ground start systems require completion of a path from the ring conductor to ground. In central offices equipped for ground start operation, the line relay coil is connected from battery to the ring conductor of the telephone line, the tip conductor is connected through a make contact on this line relay. In this manner no loop current may flow until the ring conductor is connected to a path to ground to operate the line relay, which in turn will then close the path to the tip conductor.

It is customary for ground start coin operated telephones to complete a path from the ring conductor to ground through the coin relay after the proper amount of money has been deposited in the coin telephone. This method of operation prevents the user of the coin telephone from receiving dial tone or dialing any telephone number until he has deposited coins equivalent in value to a predetermined initial rate.

In the past, 10 cent service for coin telephones not containing totalizer circuitry, has been accomplished by several methods. One of these methods employs a nickel latch or trap in the coin telephone chute to prevent the first nickel from reaching the coin relay until a second nickel has been deposited. A second method allows the first nickel to pass through the chute into the coin hopper, closing ground from the coin relay. In its travel down the coin chute the nickel causes a switch to latch and places a short across the dial impulse springs to prevent dialing of a telephone number without depositing 10 cents. The deposit of a second nickel unlatches the switch and removes the short, permitting the dial to be operated for initiation of a call. The deficiencies of the latter method are, dial tone is returned to the coin telephone with the deposit of only one nickel, and after deposit of a single nickel the hook switch may be operated to dial a number.

For telephone systems in which initial deposit rates are more than 10 cents, the latch method of preventing coins from reaching the coin relay on partial deposits is not practical, nor is it versatile enough to handle the various coin combinations or different initial deposit rates that may be required. The deficiencies of the second method of providing ground start service remain the same for initial deposit rates beyond 10 cents.

Accordingly it is the object of the present invention to provide a circuit arrangement for the ground start mode of operation of coin operated telephones, with an initial deposit rate greater than 10 cents, and to provide these same coin operated telephones with a variable initial deposit rate totalizer that will permit them to be programmed for any desired amount.

SUMMARY OF THE INVENTION

The present invention is a circuit arrangement utilizing a variable initial deposit rate totalizer similar to that disclosed in the pending application Ser. No. 409,998 of Robert H. Beeman and Robert V. Burns filed Oct. 26, 1973, to provide a ground start mode of operation for use in prepay coin operated telephones. The use of a totalizer to control the tip conductor and transmission network provides the versatility needed to operate in a ground start system with initial deposit rates greater than 10 cents.

In the present arrangement the first coin deposited enters the coin hopper associated with a coin relay, equipped with a set of coin springs, connecting the ring conductor through the coin relay to ground. The value of this first coin was registered in the totalizer. If the value is determined as less than that of a predetermined initial deposit rate, the totalizer will open the tip conductor and place a direct shunt circuit across the transmission network. Whenever the value of coins deposited equals or exceeds the initial rate that the totalizer is set for, the path of the tip conductor is completed and the shunt circuit across the transmission network is removed. The call may then be initiated.

A reset circuit for the totalizer is connected in the tip circuit to return the totalizer to the initial zero position whenever tip current flows. This reset is utilized as soon as the value of the initial rate has been deposited to reset the totalizer to zero to prepare it for the next call. It is also required during an incoming call to the coin telepone to prevent the deposit of coins less than the initial rate from disabling the telephone transmission circuit. On an incoming call, tip current flows as soon as the coin telephone hook switch is operated. Tip current flowing through the reset circuit prevents the totalizer from responding to coin deposits. Coin deposits may be required on incoming calls such as collect calls or when an operator rings back to request additional money for overtime charges.

BRIEF DESCRIPTION OF THE DRAWING

The accompanying drawing is a schematic circuit diagram of a coin operated telephone including an electronic totalizer intended for operation in the ground start prepay mode.

DESCRIPTION OF THE PREFERRED EMBODIMENT

Referring now to the accompanying drawing a circuit of a coin operated telephone including an electronic totalizer and equipped for ground start prepay operation is shown. In addition to the totalizer, those portions of the coin telephone required for the ground start prepay mode of operation are shown. Other portions not required have been eliminated from the drawing to simplify the understanding of the present invention.

Shown as a portion of the coin operated telephone circuit are terminals T and R connected to the tip and ring conductors respectively of a telephone line extending to a telephone central office, dial 101 containing dial impulsing springs, transmission network 103, receiver 104 and a transmitter 105. In addition the coin telephone circuitry includes a switch hook 102 shown in its nonoperated or onhook position, coin relay 110 and its associated coin trigger springs 111. Coin trigger springs 111 are shown in their normal position prior to the deposit of coins in the telephone. In addition the coin telephone circuit also includes coin operated switches 113 and 114 which operate in response to the deposit of nickels and dimes respectively. It should also be noted that these two springs are also shown in their normal or precoin deposit position.

The totalizer 100 consists of a power supply portion including diodes 121 through 126 inclusive, resistors 131 and 132, capacitor 133 and a zener diode 134. Also contained in the totalizer 100 is a decimal decoder counter 160 which may be a standard integrated circuit counter used to count and store information relative to the quantity and value of deposited coins. The counter circuitry may take several forms that are well-known and as such the details thereof do not form a portion of the present invention.

Included in the totalizer and connected between the coin operated switches 113 and 114 is logic circuitry consisting of gate 150, inverter 151 and capacitors 152 and 153 which provide an input from the coin operated switches 113 and 114 to the counter 160. The output of the counter 160 is connected by means of a strap 161 to gate 172, whose output is coupled through capacitor 173 to a bistable rate relay 170 having an associated contact 171. Also included in the totalizer 100 is an optical isolator device 140 which provides a reset function for the counter.

It should first be pointed out that a charging path exists from the ring conductor connected to terminal R through resistors 131 or 132 to the power supply circuitry thence to ground through the transmission network 103, the coin relay 110 and resistor 112, to provide power to the totalizer 100, while the phone is either in the on-hook or off-hook positions, respectively.

The totalizer rate relay contacts 171 are arranged to open the tip conductor and shunt the transmission network in response to a partial deposit, and to close the tip conductor and remove the network shunt on full deposit. A reset circuit located in the tip side of the line connected to terminal T holds the totalizer in the reset condition any time current flows over the tip conductors.

For a further understanding of the present invention a description of the placement of the telephone call in a coin telephone of the prepay type adapted for ground start operation in accordance with the present invention will be described.

Initially the subscriber will remove his hand set not shown, containing transmitter 105 and receiver 104 from hook switch 102 causing it to complete a circuit from terminal R through the hook switch 102 and the dial impulse springs of dial 101 to the transmission network 103 and from there to transmitter 105 and receiver 104. The return path from transmission network 103 extends through the break springs of spring combination 171 associated with relay 170, optical isolator 140 to terminal T connected to the tip conductor of the telephone line. The loop is now closed to the central office. Closure of hook switch 102 prepares a circuit for ground to be extended over the R conductor of the coin operated telephone, in order to operate the associated line relay at the telephone central office.

At this time the subscriber wishing to place a call must deposit the proper amount of money in the coin slot of the coin telephone. It should be noted that in the present embodiment is shown that the counter output 20 cents lead to strapped by means of strap 161 to the input of NOR gate 172. This strapping indicates that the initial or base rate for operation of the present coin operated telephone is 20 cents. Other base rates may be established by connecting strap 161 to one of the other terminals such as the 5 cent, 10 cent, etc., outputs of counter 160.

Assuming now that the caller deposits first a nickel coin operated switch 113 will operate momentarily, connecting ground to one of the inputs of NOR gate 150. This causes an output pulse from NOR gate 150 which is extended to counter 160, which normally has an output on the lead extending from the zero terminal lead. An output signal will now be present on the 5 cent output lead. Because it has no output connection, no signal will be extended to NOR gate 172. With the output signal being removed from the zero output lead, this will cause gate 172 to produce a pulse in the direction to cause operation of rate relay 170, which will be coupled to the relay by means of capacitor 173.

Capacitor 173 will charge and current flow to relay 170 will cease. Relay 170 being bistable will remain operated, at this time the operation of rate relay 170 will open the tip conductor connected to terminal T at contacts 171 and place a shunt across the transmission network 103. The coin will then also cause operation of coin trigger springs 111 completing a path from ground through coin relay 110 and the transmission network 103 to the ring conductor connected to terminal R. The associated telephone central office line relay will then operate and complete a connection to the tip conductor connected to terminal T and apply dial tone to the line. However, at this time no dial tone may be heard by the user because the transmission network 103 remains shunted until such time as coins equivalent in value to the predetermined 20 cents full rate are deposited.

Recalling that a 20 cent initial deposit is required before dialing can commence, the subscriber will now deposit a second nickel reoperating coin operated switch 113, and causing the advance of counter 160 to produce an output on the 10 cent output lead. It should also be noted that coin springs 111 remain operated after the initial coin deposit and therefore no further action takes place involving their circuitry at this time. The subscriber now deposits a dime operating coin operated switch 114. This produces a ground pulse through the circuitry of inverter 151 and associated capacitors 152 and 153 will cause NOR gate 150 to produce two output pulses to counter 160 causing it to advance its output from the 10 cent to 15 cent output terminal and from the 15 cent output terminal to the 20 cent output terminal.

Because strap 161 is connected between the 20 cent output terminal and the input of gate 172, NOR gate 172 will produce a zero output, causing rate relay 170 to restore due to current produced by the charge stored in capacitor 173 flowing through relay 170 in a direction to cause it to restore.

After the charge in capacitor 173 has been dissipated relay 170 will remain restored since it is a bistable relay. At the same time an output from counter 160 was extended to gate 172 the same output was also extended back over a count inhibit lead into the decimal counter 160 preventing it from operating further in response to deposit of additional coins.

With the restoration of relay 170 contact 171 will restore to their normal position and the shunt across the transmission network will be removed and the tip side of the line connected at terminal T will be connected through optical isolator 140 and the break contact of spring combination 171 to transmission network 103. Current will now flow from the ring conductor through the light emitting diodes that form a portion of optical isolator 140 to the top conductor. This current flow will cause the light emitting diode to operate, turning on the associated photo transistor also included in the optical isolator 140. This operation will complete a path from battery to the reset lead of counter 160 causing it to reset to zero. This insures that subsequent deposits do not register and the tip connection will remain closed.

At this time dial tone will be heard by the user and he may now operate his dial to effect control of the central office switching equipment to complete a connection to a selective subscriber.

After the user has reached his party and completed his call, he replaces the handset including transmitter 105 and receiver 104 on hook switch 102 opening the connections to the telephone central office. Coin battery will now be returned from the central office over the lead connected to terminal T through the optical isolator 140 and contacts 171 and the transmission network to coin relay 110 causing it to operate at this time to collect the previously deposited coins. Operation of the coin relay 110 restores coin trigger springs 111 to their normal position. At this time the coin operated telephone is fully restored to normal and is ready for placement of additional calls over its facility.

If after the subscriber has deposited one or more coins in the telephone, he decides not to complete the call, and the total number of coins deposited is not equal to the established base rate, the following sequence of events take place. To abandon the call the subscriber will place his hand set including transmitter 105 and receiver 104 in its normal position on hook switch 102 causing it to restore. The restoration of hook switch 102 opens the loop connection to the telephone central office, causing the central office equipment to return coin battery over the lead connected to terminal T. This coin battery is conducted from terminal T through the optical isolator 140, resistor 174, neon diode 175, the transmission network 103, coin relay 110, coin springs 111 to ground. Current flow over this path will cause optical isolator 140 to operate to reset decimal counter 160 to zero, with the resultant output restoring relay 170. Restored contacts 171 provide a direct path over which the coin battery is applied to coin relay 110 causing it to operate. With the operation of coin relay 110 the previously deposited coins are refunded and the present coin telephone returns to its normal condition.

When incoming calls are received at the coin operated telephone in accordance with the present invention, the central office provides continuity to both tip and ring leads. Answer by the coin telephone user will cause loop current to flow through the reset circuit including optical isolator 140 which prevents coin deposits from registering in the totalizer 100. Overtime deposits or collect charges do not register in the totalizer and thus the rate relay maintains the tip conductor closed for any and all deposits.

It should be noted that the present totalizer circuit derives its power directly from the telephone line in a manner similar to that disclosed in the forementioned co-pending application.

While a preferred embodiment of the present invention only has been shown, it will be obvious that numerous modifications may be made without departing from the spirit and scope of the present invention, which shall be limited only by the claims appended hereto.

What is claimed is:

1. A coin operated telephone instrument adapted for connection to a telephone central office by means of a telephone line, said central office of the type requiring a ground start signal from said instrument prior to origination of a call by said instrument, said instrument comprising: a transmitter, a receiver, a calling device, a coin detecting mechanism normally inhibiting origination of a call by said instrument, said coin detecting mechanism operated in response to deposit of a first coin of any value to transmit a ground start signal to said central office over said telephone line; and a totalizer comprising counting means advanced once in response to deposit of each coin of a first value and advanced twice in response to deposit of each coin of a second value, said counting means initially operated to generate a first output in response to a first advance and further operated to generate a second output in response to a predetermined number of additional advances; switching means connected to said counting means initially operated in response to said counting means first output to further inhibit origination of a call by said instrument, and further operated in response to said counting means second output to permit origination of a call by said instrument.

2. A coin operated telephone as claimed in claim 1 wherein: said switching means initial operation completes a shunt circuit around said transmitter, said receiver and said calling device and said switching means further operation removing said shunt from said calling device, said transmitter and said receiver.

3. A coin operated telephone instrument as claimed in claim 1 wherein: There is further included reset means comprising a circuit connection between said counting means and said telephone line, said reset means operated in response to connection of said instrument to said central office to reset said counting means.

4. A coin operated telephone instrument as claimed in claim 3 wherein: said switching means initial operation inhibits operation of said reset means and said switching means further operation permits operation of said reset means.

5. A coin operated telephone instrument as claimed in claim 3 wherein: said reset means are further operated in response to an incoming call from said central office to said telephone instrument to inhibit operation of said reset means in response to said counting means being advanced in response to deposit of coins.

6. A coin operated telephone instrument as claimed in claim 1 wherein: said counting means further operation inhibits further advance of said counting means.

7. A coin operated telephone instrument as claimed in claim 1 wherein: said counting means comprise a decimal counter and logic circuitry, said logic circuitry operated in response to deposit of a coin of a first value to generate a single output pulse to advance said counter once, and in response to deposit of a coin of a second value to advance said counter twice.

8. A coin operated telephone instrument as claimed in claim 1 wherein: said switching means comprise a relay.

* * * * *